United States Patent [19]
DuHack et al.

[11] Patent Number: 6,076,801
[45] Date of Patent: Jun. 20, 2000

[54] APPARATUS FOR IMPROVING THE SEATING OF AN ARMATURE FOR A WATER VALVE

[75] Inventors: Michael R. DuHack; Steve W. Smock, both of Marion County, Ind.

[73] Assignee: Emerson Electric Co., St. Louis, Mo.

[21] Appl. No.: 09/207,982

[22] Filed: Dec. 8, 1998

[51] Int. Cl.[7] .............................. F16K 31/06; F16K 47/14
[52] U.S. Cl. ...................... 251/129.15; 251/118; 251/362
[58] Field of Search ............................... 251/129.15, 362, 251/118

[56] References Cited

U.S. PATENT DOCUMENTS

| | | | |
|---|---|---|---|
| 3,480,040 | 11/1969 | Erickson | 251/129.15 X |
| 4,341,241 | 7/1982 | Baker | 251/129.15 X |
| 4,558,844 | 12/1985 | Donahue, Jr. | 251/129.15 X |
| 4,651,971 | 3/1987 | Donahue, Jr. | 251/129.15 |
| 4,697,608 | 10/1987 | Kolze et al. | 251/129.15 X |
| 4,720,078 | 1/1988 | Nakamura et al. | 251/129.15 |
| 4,753,416 | 6/1988 | Inagaki et al. | 251/129.15 |
| 4,817,914 | 4/1989 | Pick et al. | 251/129.15 |
| 4,936,337 | 6/1990 | DuHack | 251/129.15 X |
| 4,967,786 | 11/1990 | DuHack | 251/129.15 X |
| 5,154,394 | 10/1992 | DuHack | 251/129.15 X |
| 5,232,196 | 8/1993 | Hutchings et al. | 251/129.15 X |
| 5,579,741 | 12/1996 | Cook et al. | 251/129.15 X |

*Primary Examiner*—John Rivell
*Attorney, Agent, or Firm*—Mark D. Becker

[57] ABSTRACT

An appliance water valve assembly includes a valve body and an armature which is movable within the valve body. The armature includes an armature tip. The appliance water valve also has a valve seat which includes a valve seat orifice. The valve seat is positioned in cooperation with the armature tip such that the armature tip contacts the valve seat orifice when the appliance water valve is in a closed position and the armature tip is spaced apart from the valve seat orifice when the valve is an open position. The valve seat further includes a cylindrical ring which is positioned around the valve seat orifice. This cylindrical ring protects the valve seat orifice from damage.

8 Claims, 4 Drawing Sheets

APPARATUS FOR IMPROVING THE SEATING OF AN ARMATURE FOR A WATER VALVE

BACKGROUND OF THE INVENTION

The present invention relates generally to water valves, and more specifically to an apparatus for improving the actuation characteristics of an armature assembly in a water valve.

Electrically operated water valves are commonly used in many household appliances such as dishwashers, clothes washers, and refrigerator icemakers. Such appliance water valves are generally controlled by a controller included in the appliance, thereby providing a flow of water, at a predetermined flow rate, for use by the appliance.

A critical element in the manufacture of water valves is the alignment of the valve seat orifice and the armature tip. If the armature tip does not properly block the valve seat orifice an internal leak could occur which would result in the unnecessary usage of water. Further, any type of damage to the orifice valve seat during the manufacture or assembly of the valve could result in a leak.

What is needed therefore, is an appliance water valve which has internal features which act to align the valve orifice seat and the armature and also act to protect the valve seat from damage.

SUMMARY OF THE INVENTION

In accordance with a first embodiment of the present invention, there is provided an appliance water valve assembly having a valve body and an armature which is movable within the valve body. The armature includes an armature tip. The appliance water valve also has a valve seat which includes a valve seat orifice. The valve seat is positioned in cooperation with the armature tip such that the armature tip contacts the valve seat orifice when the appliance water valve is in a closed position and the armature tip is spaced apart from the valve seat orifice when the valve is an open position. The valve seat further includes a cylindrical ring which is positioned around the valve seat orifice. This cylindrical ring protects the valve seat orifice from damage.

It is therefore an object of the present invention to provide a valve assembly with improved manufacturability.

It is another object of the present invention to provide a water valve assembly with improved performance.

It is a further object of the present invention to provide a water valve assembly with improved reliability.

It is yet another object of the present invention to provide an improved water valve assembly with an apparatus to ensure proper closing of the water valve orifice.

It is moreover an object of the present invention to provide a new and useful apparatus for preventing distortion of the water valve orifice during fabrication.

It is yet another object of the present invention to provide a water valve assembly which is relatively quiet and has a relatively good flow rate.

The above and other objects, features, and advantages of the present invention will become apparent from the following description and the attached drawings.

DETAILED DESCRIPTION OF THE INVENTION

Figure 1:
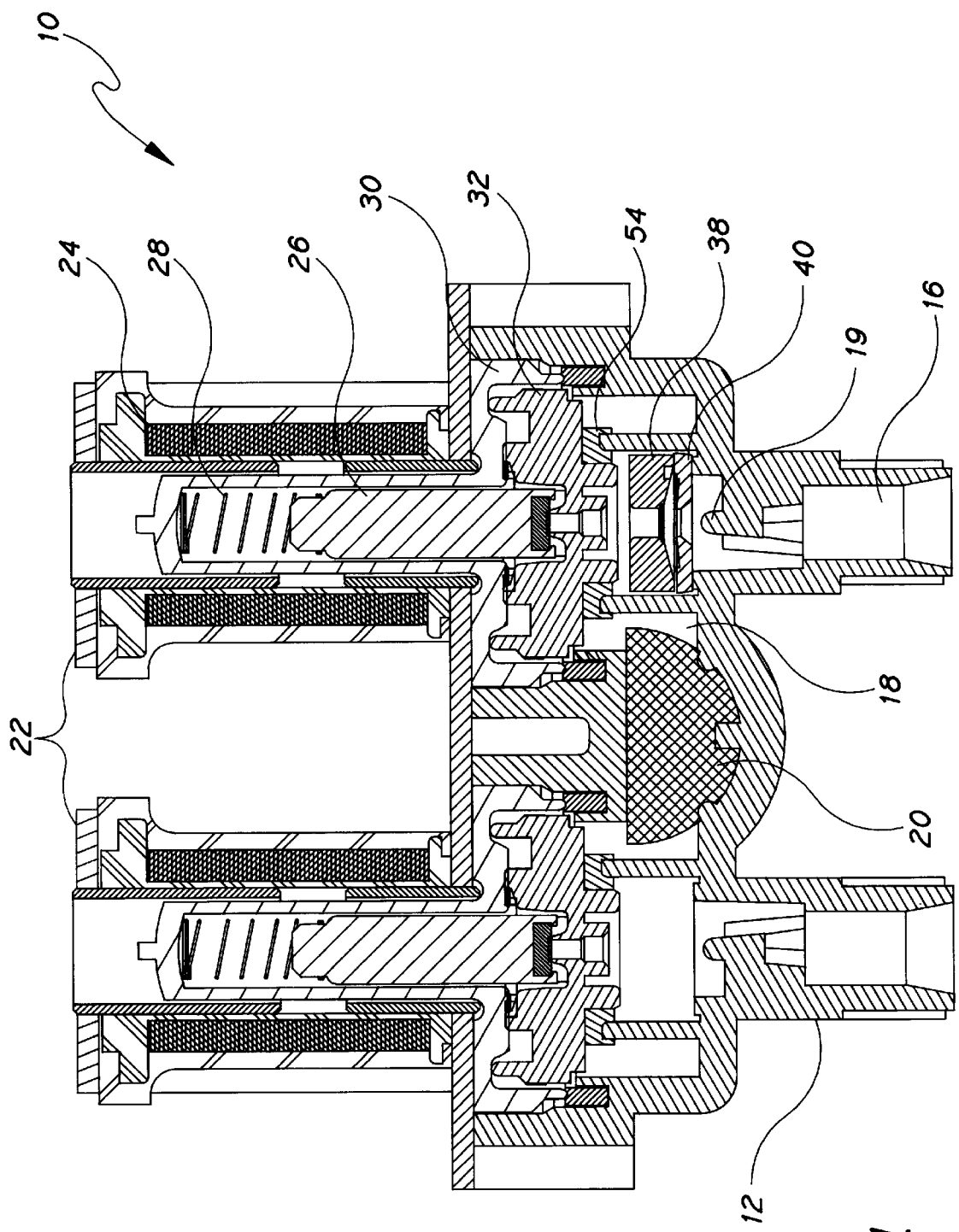
FIG. 1 is a cross sectional view of an appliance water valve in the closed position which incorporates the features of the present invention therein.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Figure 2:
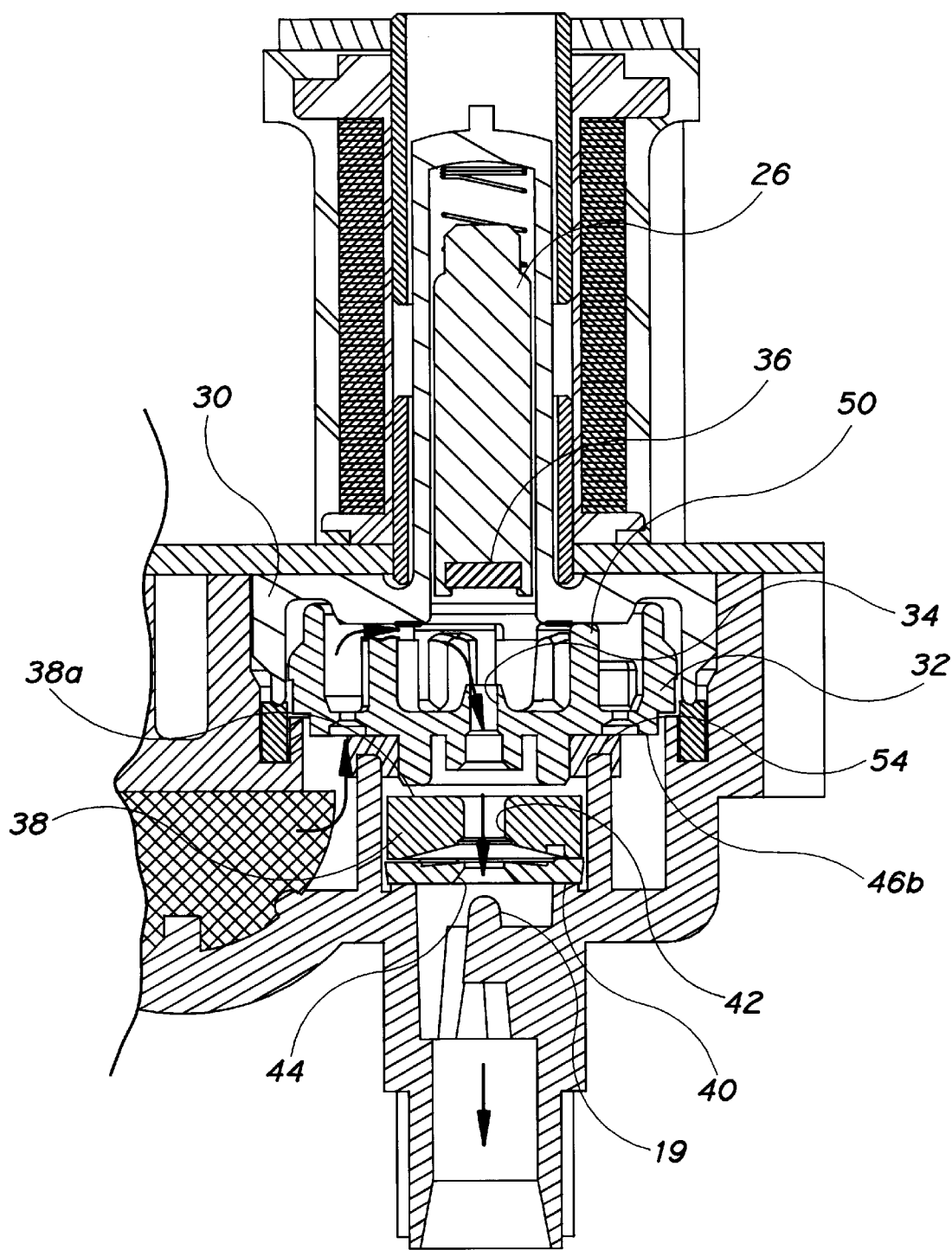
FIG. 2 is an enlarged cross sectional view of the appliance water valve of FIG. 1 with the valve shown in the open position.

Referring now to FIGS. 1 and 2, there is shown a cross sectional view of an appliance water valve 10. The appliance water valve 10 includes a valve body 12, typically polypropylene, having an inlet 14 (not shown) and at least one outlet 16 and a valving cavity 18 disposed between and being in fluid communication with the inlet opening 14 and the outlet 16. For dual valve body designs, such as those utilized in refrigerators with an icemaker and a water dispenser, two outlets are defined in the valve body 12. Preferably, the valve body 12 will include a noise suppression bullet 19 position upstream of the outlet 16 to disperse and channel water flow into the outlet 16. The noise suppression bullet 19 provides an object directly in the path of the flowing water to create backpressure for reducing the water velocity. Reduction in the velocity of the water flow acts to reduce the noise level of the water flowing through the appliance valve 10. Attached to the valve body 12 is an inlet screen 20.

The inlet 14 is typically connected to a residential water line (not shown), thereby providing for a water flow to the valve 10. The outlet 16 is typically a tube-type connector which is connected to a fill line of an appliance (not shown), such as a dishwasher, clothes washer, or an icemaker.

The appliance water valve 10 further includes at least one valve actuator 22 sealingly coupled to the valve body 12. The valve actuator 22 includes an solenoid coil 24, an armature 26, a spring 28, and a guide tube 30. The armature 26 and spring 28 are disposed in the guide tube 30 with the spring 28 acting upon the armature 26 to bias the armature 26 towards a valve seat 32 thereby blocking a valve seat orifice 34 and preventing the flow of water through the valve body 12. When the solenoid coil 24 is electrically energized, a magnetic field is created which lifts the armature 26 into an open position where the armature 26 is spaced apart from the valve seat 32 and thereby allows a flow of water to advance into the valve body 12 through the inlet opening 14. Thereafter, the flow of water advances through the valving cavity 18, passed through the valve seat orifice 34 and exits out the valve body 12 through the outlet 16 and into the fill line of the appliance (not shown). The armature 26 includes an armature tip 36 which contacts the valve seat 32 and blocks the valve seat orifice 34. The armature tip 36 is preferably made of a flexible material, such as ethylene propylene (EP) rubber, thereby providing desirable sealing characteristics when biased against the valve seat 32.

When the valve actuator 22 is in a closed position, such as shown in FIG. 1, the armature 26 is biased against the valving seat 32, thereby preventing water from flowing out of the valving chamber 18 through the valve seat orifice 34. Hence, the valve actuator 22 and the valve body 12 (including the valving seat 32), cooperate to selectively control the advancement of water from the inlet opening 14 to the outlet 16.

The appliance valve further includes a flow control member 38 and a flow control washer 40. The flow control member 38, which is disposed between the valve seat 32 and the flow control washer 40, is made of flexible material such as ethylene propylene (EP) rubber, and has a central passage 42 defined therein. The flow control member 38 flexes or deforms in response to variations in inlet water pressure exerted on an upstream surface 38a thereof. In particular, a higher inlet water pressure on the upstream surface 38a causes a greater amount of flexing or deformity of the flow control member 38, thereby reducing the diameter of the central passage 42. A lower inlet water pressure exerted on the upstream surface 38a, causes the flexing or deformity of the flow control to be reduced, thereby increasing the diameter of the central passage 42.

The flow control washer 40 has a washer orifice 44 defined therein, and provides a surface on which the flow control member 38 is supported. The flow control washer 40 is typically made of a metallic material, such as stainless steel or rigid plasitc such as acetal.

Figure 3:
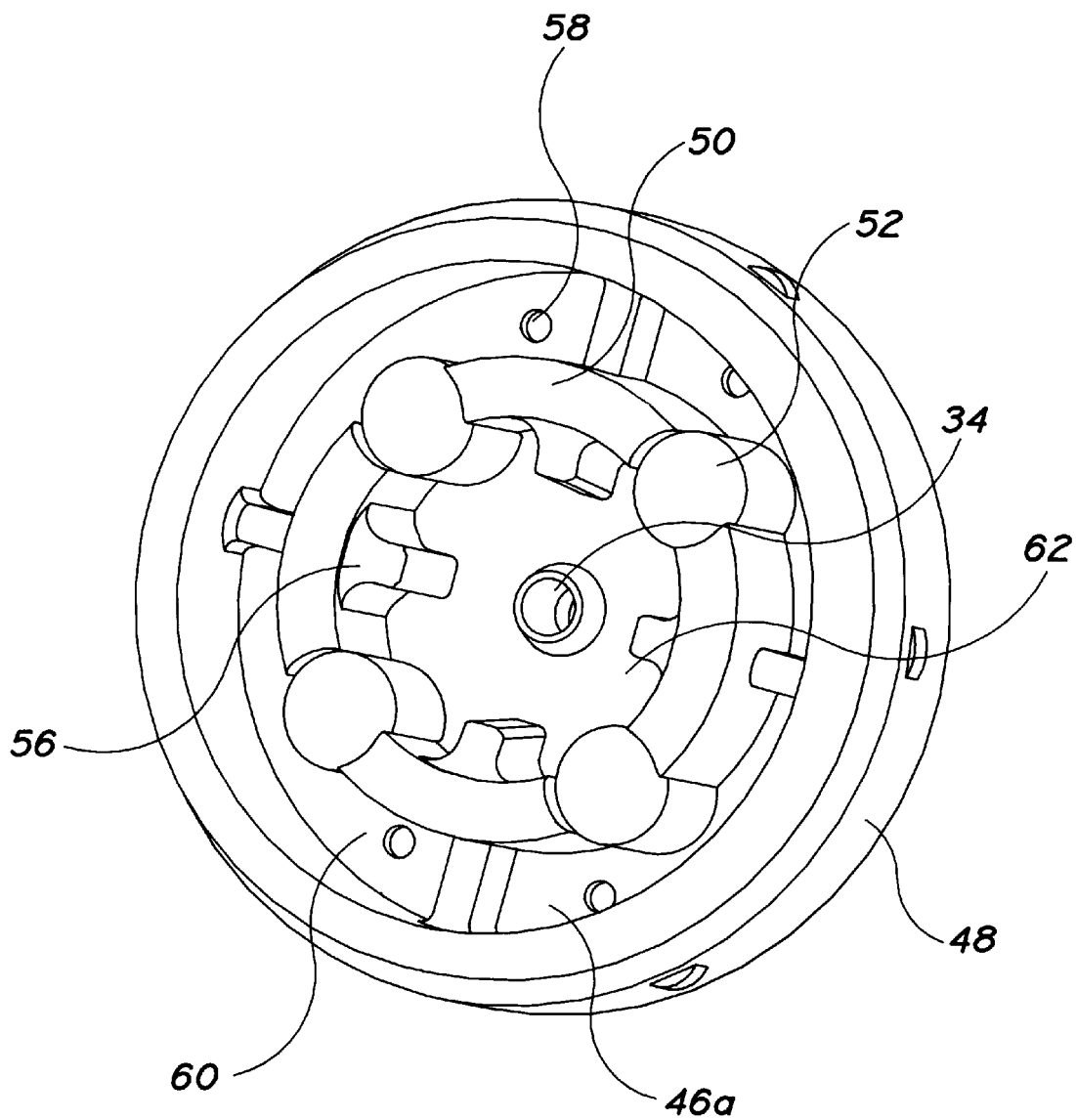
FIG. 3 is an isometric view of the inlet side of the valve orifice valve seat which incorporates the features of the present invention therein of the appliance water valve of FIG. 1.
Figure 4:
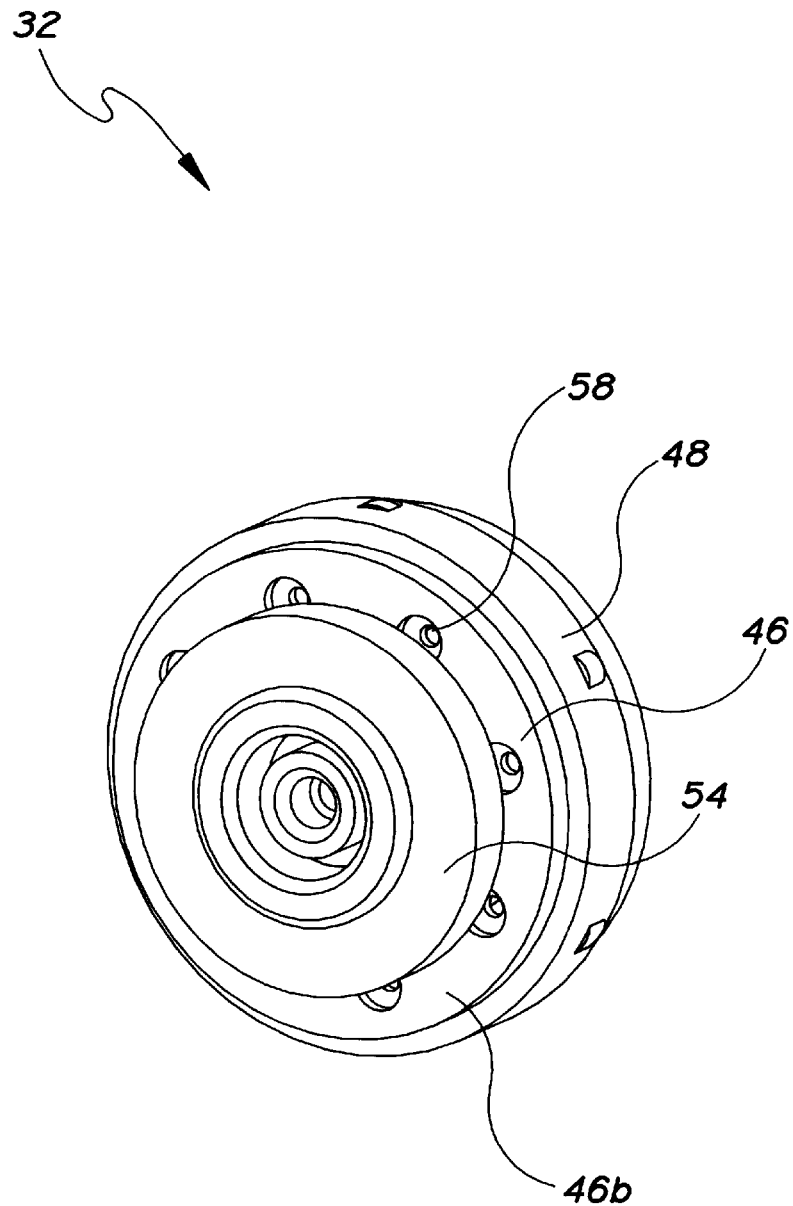
FIG. 4 is an isometric view of the outlet side of the valve orifice valve seat which incorporates the features of the present invention therein of the appliance water valve of FIG. 1 and including the seal.

FIGS. 3 and 4 show the valve seat 32 in more detail. The valve seat 32 is typically made of a plastic material, such as polypropylene and is disposed between the valve body 12 and the guide tube 30. The valve seat 32 includes a base flange 46, side walls 48, a cylindrical ring 50, flow depressions 52, seal 54, guide rails 56 and flow passages 58. The base flange 46 includes a downstream surface 46a and an upstream surface 46b.

The seal 54 is disposed on the base flange upstream surface 46b and is positioned such that when the appliance valve 10 is assembled, the seal 54 is compressed between the valve body and the valve seat 32. The cylindrical ring 50 and guide rails 56 are disposed on the downstream surface 46a of the base flange 46. The guide rails 56 are positioned in the inner cavity 62 of the cylindrical ring 50 and sized to ensure that the armature tip 36 is in a centered position over the valve seat orifice 34. The cylindrical ring 50 is positioned perpendicular to the base flange 46 and preferably has a height of 0.21". This height is sufficient to protect the valve seat orifice 34 and the armature tip 36 during the appliance valve assembly process. The height of the cylindrical ring 50 is also designed such that when the valve actuator 22 is assembled to the valve body 12, the guide tube 30 will engage the cylindrical ring 50 and thereby protect the valve seat 32 from distorting. This insures that the valve seat orifice 34 is in the proper orientation to allow for a good seal with the armature tip 36. Also by loading the valve seat 32 through the cylindrical ring 50, direct pressure is transmitted to the seal 54 thereby ensuring a water tight seal.

Referring to FIGS. 2 and 3, the valve seat 32 further includes a plurality of flow passages 58 defined therein. Preferably, the flow passages 58 have a depth of approximately 0.040 inch below the cylindrical ring 50. The total area of the flow passages 58 must be sized to allows for a sufficient volume of water to flow through the appliance valve. Depending on the desired flow rate of the valve, the area of the flow passages 58 can be changed.

The cylindrical ring 50 of the valve seat 32 further includes a plurality of flow depressions 52. When the appliance valve 10 is assembled, the cylindrical ring 50 is in contact with the guide tube 30. The flow depressions 52 allow fluid to flow from the outer cavity 60 of the valve seat 32 to the inner cavity of the valve seat 32. The flow depressions are preferably sized such that no additional back pressure is added to the flow passages 58. Without the flow depressions, the flow of fluid through the appliance valve 10 would be blocked.

Hence, water flowing from the inlet 14 is advanced through the flow passages 58 to the outer cavity 60 and through the flow depressions 52 to the inner cavity 62. When the valve is opened, the fluid flows past the armature tip 36 and through the valve seat orifice 34. The configuration of the valve seat 32 and the orientation to the flow control member 38 functions to reduce the velocity of the flow of water advancing through the central passage 42 of the flow control member 38, which in turn reduces cavitation in the appliance water valve 10 and thereby reduces the amount of noise created by the appliance water valve 10.

Moreover, orientation of the flow passage 58 to the central passage 42 of the flow control member 38 requires the flow of fluid to completely reverse direction and thereby as the flow of water exits the flow passages 58, the flow of water must first strike or impinge upon the guide tube 30 and the walls of the outer cavity 60 before being directed through the flow depressions 50 and into the inner cavity 62.

Further upon exiting the flow control washer orifice 44 the flow of fluid strikes upon the noise suppression bullet 19. The bullet 19 is preferably molded into the valve body 12. In an alternative configuration (not shown) the bullet 19 may protrude into or through the washer orifice 44 of the flow control washer 40.

While the invention has been illustrated and described in detail in the drawings and foregoing description, such an illustration and description is to be considered as exemplary and not restrictive in character, it being understood that only the preferred embodiments have been shown and described and that all changes and modifications that come within the spirit of the invention are desired to be protected.

What is claimed is:

1. An appliance water valve assembly, comprising:
    a valve body;
    an armature movable within said valve body, said armature having an armature tip;
    a valve seat having a base flange, a side wall, and a valve seat orifice, said valve seat orifice being positioned in cooperation with said armature tip, said armature tip contacting said valve seat orifice when the valve is in a closed position and said armature tip being spaced apart from said valve seat orifice when said valve is an open position; and
    said valve seat further including a cylindrical ring positioned approximately perpendicular to the base flange and internal to said side wall, said cylindrical ring positioned around said valve seat orifice, whereby said cylindrical ring protects said valve seat orifice from damage.

2. The appliance water valve assembly of claim 1 wherein the compressive forces applied to the valve assembly during assembly act on said side wall and said cylindrical ring of said valve seat, thereby preventing distortion of said valve seat.

3. The appliance water valve assembly of claim 2 further including a guide tube, said armature being movably positioned within said guide tube, wherein the compressive forces applied to the valve assembly during assembly are applied through the guide tube and act on the side wall and the cylindrical ring of said valve seat.

4. The appliance water valve assembly of claim 1 wherein said cylindrical ring has a height of approximately 0.21 inches.

5. The appliance water valve assembly of claim 1, wherein said cylindrical ring has an inner diameter, said cylindrical ring includes guide rails positioned on said inner diameter, said guide rails being sized to guide said armature when said armature moves between the open and the closed positions and thereby maintaining proper alignment of said armature tip and said valve seat orifice.

6. The appliance water valve assembly of claim 5 wherein said armature tip is made of rubber, said guide rails being positioned to ensure said armature tip is centered over said valve seat orifice.

7. The appliance water valve assembly of claim 5 wherein said valve seat further includes a seal, said seal contacting said valve body to prevent internal water leakage.

8. The appliance water valve assembly of claim 1 further including a guide tube, said armature being movably positioned within said guide tube, said cylindrical ring cooperating with said guide tube to form an outer cavity and an inner cavity, said cylindrical ring including at least one flow depression to allow for the flow of fluid between said outer and said inner cavities.

* * * * *